(No Model.)

A. S. VOSE.
RAND GUARD AND KNIFE.

No. 561,034. Patented May 26, 1896.

WITNESSES.
Matthew M. Blunt.
J. Murphy.

INVENTOR.
Ambrose S. Vose
by Jas. H. Churchill
ATT'Y.

UNITED STATES PATENT OFFICE.

AMBROSE S. VOSE, OF BOSTON, MASSACHUSETTS.

RAND GUARD AND KNIFE.

SPECIFICATION forming part of Letters Patent No. 561,034, dated May 26, 1896.

Application filed March 3, 1896. Serial No. 581,714. (No model.)

*To all whom it may concern:*

Be it known that I, AMBROSE S. VOSE, residing in Boston, county of Suffolk, and State of Massachusetts, have invented an Improvement in Rand Guards and Knives, of which the following description, in connection with the accompanying drawings, is a specification, like letters and figures on the drawings representing like parts.

This invention relates to a novel rand guard or shield and a rand knife or cutter carried thereby for cutting the rand of the heels or soles of boots and shoes. The rand guard or shield and its knife may be used to advantage with a rotary heel trimmer or cutter or with an edge trimmer or cutter, and especially with a rotary trimmer or cutter having a head or wheel of a special construction, as will be described, whereby additional clearance for the rand-knives is obtained.

In accordance with this invention the rand guard or shield is provided with one or more radially-disposed slots in its circumference, in which are located rand-knives capable of being adjusted radially, so as to place their cutting edges in proper working position to obtain the desired randing or cutting effect, the said shield being also provided with means whereby the rand-knives may be firmly clamped or secured in their adjusted position. These and other features of this invention will be pointed out in the claims at the end of this specification.

Figure 1:
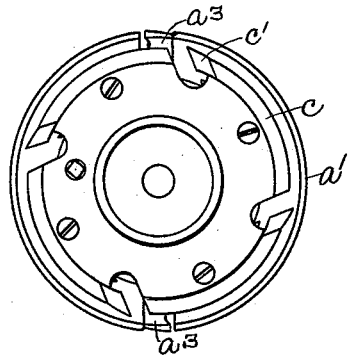
Figure 3:
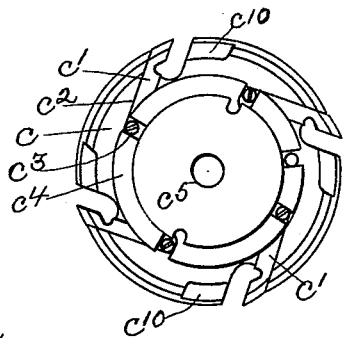
Figure 2:
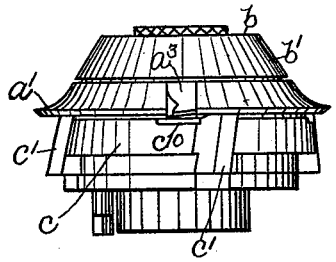
Figure 4:
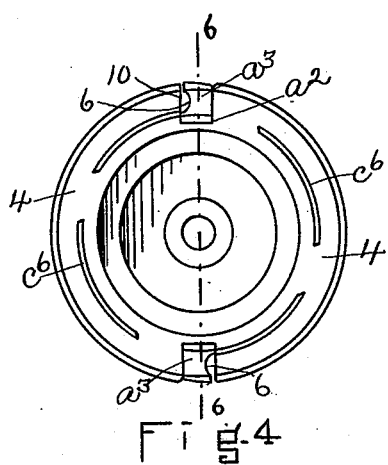
Figure 5:
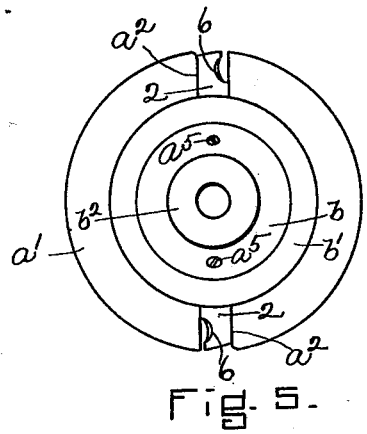
Figure 6:
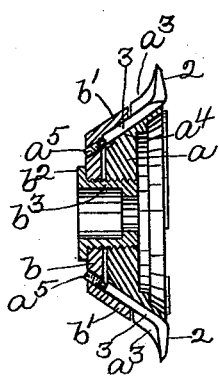

Figure 1 is a side elevation of one form of rotary cutter or trimmer provided with a rand guard or shield and a rand-knife embodying this invention; Fig. 2, a plan view of the rotary cutter and rand-guard shown in Fig. 1; Fig. 3, a side elevation of the rotary cutter or trimmer shown in Fig. 1 with the rand-guard omitted and looking at the rear of Fig. 1; Fig. 4, an inner side elevation of the rand-guard; Fig. 5, an outer side elevation of the rand-guard; Fig. 6, a section of the rand-guard shown in Fig. 4 on the line 6 6, with the rand-knives in elevation; and Fig. 7 a detail in perspective of the rand-knife shown in Fig. 6.

The rand-guard herein shown as embodying this invention consists of a frustum-shaped body $a$, concaved on its outer side near its circumference to form a substantially thin rim portion $a'$, the edge of which is adapted to enter the rand-crease of the boot or shoe, the said rim portion being provided with one or more radially-disposed slots $a^2$, extended through the said rim portion for the reception of the cutting portion or blade 2 of a rand-knife $a^3$, which is provided, as herein shown, (see Figs. 6 and 7,) with an oblong shank 3. The slot $a^2$ in the rim portion communicates with a suitable slot or channel $a^4$ on the outer surface of the body $a$, which channel is made in the direction of the length of the body $a$ and into which the shank 3 is fitted to move longitudinally, so as to adjust the blade 2 with relation to the inner flat face 4 of the rim portion $a'$.

Figure 7:
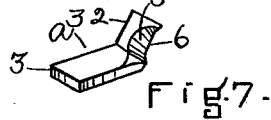

By reference to Fig. 7 it will be seen that the blade 2 of the rand-knife extends from the shank 3 substantially at an obtuse angle thereto, so that the said shank may fit into the inclined channel $a^4$ and have the blade 2 occupy a position substantially at right angles to the axis of the body $a$. The rand knife $a^3$ may be adjusted on the rand-guard by means of an adjusting device, preferably a screw $a^5$, inserted into and through a threaded hole in a fastening or clamping device for the rand-knife, which device is preferably made as herein shown and consists of an annular cover or plate $b$, provided with an annular frustum-shaped flange $b'$, forming a hollow clamping device, the flange $b'$ fitting over the shank 3 of the rand-knife, the cover or plate $b$ being provided with a threaded hole through which the adjusting-screw $a^5$ is extended, so that its end engages the end of the shank 3, whereby the latter may be moved in its channel when the clamping-flange is loosened.

The clamping device for the rand-knife may be secured to the body $a$, preferably, as herein shown, by means of a threaded nut consisting of an annular flange $b^2$ on a hollow stem $b^3$, threaded on its outer circumference to engage screw-threads on the wall of a central bore or opening in the body $a$. By turning the threaded nut in one direction the flange $b^2$ will force the clamping hollow or dish-shaped device upon the body $a$ and will firmly secure the rand-knife to the said body, and by turning the said threaded nut in an opposite direction the clamping device will be loosened, so as to release the rand-knife and permit it to be adjusted in one direction by the screw $a^5$ and in the opposite direction by the hand pressing upon the blade 2.

The blade 2 is preferably concaved on one side, as at 5, which may be designated the "back side" of the blade, and its front side may be made substantially flat, so as to form the cutting edge 6. The blade 2 is ground or made inclined from the cutting edge to its back or heel, so that when adjusted into its operative position the cutting edge 6 of the blade will be presented to the work at a most efficient cutting angle, as clearly shown in Fig. 2.

The adjustability of the rand-knife accomplishes two results—that is, it permits the rand-knife to be adjusted so as to cut off or remove rands of different or varying thicknesses, and it also enables the cutting edge to be placed in a constant or fixed position with relation to the guard after each grinding or sharpening.

The concaved cutting edge 6 of the blade forms, with the edge 10 of the slot $a^2$, a clearance-opening for the passage of the chips or material cut by the knife, the said chips passing to the outside of the rand guard or shield. The rand guard and knife herein shown is adapted to be used in connection with a rotary heel or edge cutter or trimmer, and in the present instance it is shown as coöperating with a rotary edge-cutter of substantially the construction shown in United States Patent No. 547,098, granted to me October 1, 1895, and consisting of an annular body or wheel $c$, provided with knives or blades $c'$, inserted into inclined slots $c^2$ in the body or wheel $c$ and connected by the screws $c^3$ to a band or ring $c^4$, mounted to turn on the hub of the wheel, to effect simultaneous adjustment of the knives $c'$, the said band or ring being clamped to the body or wheel $c$ by a nut $c^5$. The inclined slots $c^2$ are enlarged at their outer end to form clearance-openings for the knives $c'$, and the rand shield or guard is provided on its face 4, as herein shown, with an annular wing or rib $c^6$, which is adapted to fit over the edge of the body or wheel $c$, and in order to obtain additional clearance for the rand-knife the body or wheel $c$ is provided on its side at its edge with a cavity or recess $c^{10}$, into which the edge of the rand-knife may project and yet leave a space on the front side of the rand-knife, between it and the side of the body or wheel $c$, for the passage of chips into the clearance-openings for the trimming-knives.

The rand-guard and its knife may be secured to the shaft of the machine on which it is used by means of a suitable bolt or screw, (not shown,) but which is passed through the stem $b^3$ of the clamping-nut.

In practice the rand-guard and its knife will generally be used in conjunction with a rotary cutter or trimmer; but it is evident it may be used alone. Furthermore, the rand-guard may be provided with any desired number of adjustable knives.

I claim—

1. The combination with a rand guard or shield, of a knife or blade carried thereby to revolve therewith, means to adjust the said knife on its guard, and means to secure the said knife in its adjusted position, substantially as described.

2. The combination with a rand guard or shield provided with a slot or opening in its rim portion, and with a channel in its body portion communicating with said slot or opening, of a rand-knife consisting of a blade and a shank, the said blade being extended through the said slot or opening and the said shank fitting the said channel, means to act on the said shank to adjust the said blade, and means to secure the knife in its adjusted position, substantially as described.

3. The combination with a guard or shield consisting of a frustum-shaped body portion provided with a slot or opening in its rim portion and with a channel on its outer side, of a knife consisting of a shank fitted into the said channel, and a blade extended at an angle to said shank to extend into the said slot or opening, a clamping device to secure the said shank to the guard, and an adjusting device for the knife carried by the clamping device, substantially as described.

4. The combination with a rand guard or shield, of a rand-knife carried thereby to revolve therewith, a clamping device to secure the said knife to the guard, and an adjusting device carried by the clamping device to coöperate with the said knife, substantially as described.

5. The combination with a rotary cutter provided with an annular body or wheel provided with a notch or recess $c^{10}$ on one side, of a rand-guard coöperating with said body and provided with a slot or opening in its face adjacent to the rotary cutter to register with the notch or recess $c^{10}$, a rand-knife provided with a blade extended through said slot and having its cutting edge separated from one side of the slot to leave a clearance-space for the passage of the cut material to the rear side of the blade, the said recess forming a clearance-space for the passage on the front side of the blade of the cut material, substantially as described.

6. The combination, with a frustum-shaped rand-guard provided with a slot or opening in its rim portion and with a channel on its outer side communicating with said slot, a rand-knife consisting of a shank to enter the said channel and a blade at an angle to the shank to enter the said slot or opening, a hollow clamping device fitted over the rand-guard to engage the shank of the said knife, an adjusting device for the knife, and means to secure the clamping device to the guard, substantially as described.

7. The combination with a rand guard or shield consisting of an annular body portion, a rand-knife secured to the said body portion and movable axially thereon, a clamping device to secure the said knife in its adjusted position, and means to adjust said knife on its guard, substantially as described.

In testimony whereof I have signed my name to this specification in the presence of two subscribing witnesses.

AMBROSE S. VOSE.

Witnesses:
JAS. H. CHURCHILL,
J. MURPHY.